United States Patent Office 2,905,076
Patented Sept. 22, 1959

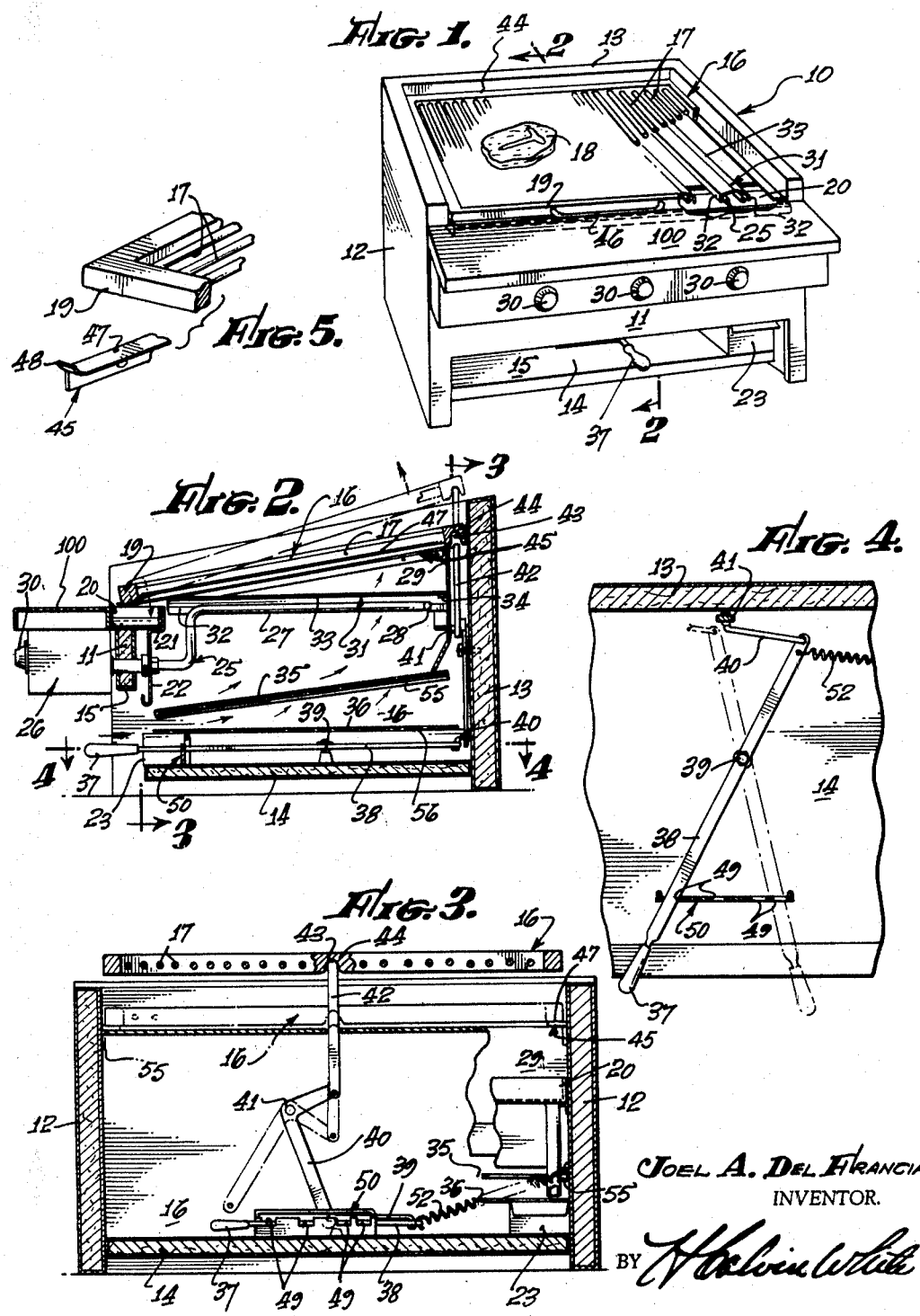

2,905,076
ADJUSTABLE GRID BROILER
Joel Alfred Del Francia, Los Angeles, Calif.
Application April 7, 1958, Serial No. 726,964
14 Claims. (Cl. 99—443)

This invention has to do generally with improvements in cooking broilers incorporating what has come to be known as flame control, and more particularly concerns an improved adjustable grid broiler of this type incorporating a novel combination of broiler elements by which tilting of the grid may be rapidly accomplished without danger of burning the operator's hand.

In flame control broilers, adjustment of the grid tilt or slope to various degrees allows control of the quantity of grease permitted to drop into hot surfaces within the broiler housing interior. Thus, while some of the grease may be drained away along the grid bars and isolated from flames rising within the housing interior, the remaining grease may be permitted to drip through the grid onto heated surfaces in the broiler so as to produce flames and smoke rising to the edible on the grid and giving it a charcoal-like flavor. Limitations of known equipment of this kind include difficulties encountered in manually lifting or tilting heavy iron grids to achieve the desired grease drainage control and extreme heating of parts manipulable to tilt the grid so as often to burn the hands of the user.

A general object of the present invention is to provide an improved adjustable grid broiler in which quick heating of the grid and edible may be achieved without excessive heating of novel mechanism incorporated within the broiler housing interior for lifting and lowering the grid at the option and convenience of the operator. Not only is the latter mechanism isolated from the flames and heat radiation within the broiler housing, even though the mechanism itself is completely within the housing interior, but also the structure of the mechanism is such as to remove the problems and inconveniencies involved in lifting and lowering of very heavy iron grids.

In its preferred form the invention embodies a housing having upright front, side and rear walls, a heavy iron grid overlying the upper interior of the housing from which heat is supplied to the grid, the housing front wall containing a transversely elongated opening through which outside air may pass into the housing interior and upwardly therein, means for variably frontwardly tilting the grid including an arm projecting forwardly through the front wall opening so as to be accessible at the front of the housing, support means movable up and down near the housing rear wall to lift and lower the grid from the rear thereof in response to transverse arm movement in the front wall opening, and means near the front of the housing for holding the arm in different transverse positions corresponding to different forward tilt positions of the grid. The adjustment arm is preferably carried near the bottom of the housing at the interior thereof so as to be removed from proximity to the flames and smoke rising in the upper interior of the housing. Also, by having the adjustment arm project forwardly through the air opening in the front wall of the housing, the arm is not only completely accessible from the front of the housing, but also air entering that opening passes in cooling relation with the arm so that its temperature is kept safely low. In addition, all of the mechanism for lifting and lowering the grid from the rear thereof so as to tilt the grid forwardly, is located at the interior side of the housing rear wall and bottom so as to be protected against damage and also accessible for repair through the front wall opening of the broiler.

As will be brought out, flames and smoke are confined to the upper interior of the broiler by incorporating hoods over the electrical heating elements directly underlying the grid, the hoods presenting extended surface area to the grid for receiving dropping grease and igniting same. Heat radiated downwardly from the hoods and the remainder of the dropping grease are both intercepted by means preferably comprising a screen underlying the heater elements and overlying the grid adjusting mechanism, so as to block heat transmission to the grid tilt adjusting mechanism.

One other important feature of the invention having to do with easing lifting and lowering of the heavy grid is embodied in yieldable means, preferably a tension spring connected with the grid tilting mechanism and transmitting force acting to counterweight the grid. This force is desirably insufficient by itself to lift the grid bodily, so that the operator manipulating the arm projecting through the front wall opening will normally exert some force in lifting and lowering the grid.

These and other features and objects of the invention as well as the details of an illustrative embodiment, will be more fully understood from the following detailed description of the drawings, in which:

Fig. 1 is a frontal perspective showing of a preferred embodiment of the improved adjustable grid broiler;

Fig. 2 is a vertical section taken on line 2—2 of Fig. 1

Fig. 3 is a vertical section taken on line 3—3 of Fig. 2

Fig. 4 is a horizontal section taken on line 4—4 of Fig. 2;

Fig. 5 is a perspective fragmentary showing of the grid forward end and one of the housing side wall brackets for holding the grid against forward sliding during its lowermost tilt position, illustrated in Fig. 2.

In the drawings the broiler housing 10 is shown to include front, side and rear walls 11, 12 and 13 respectively and a horizontal bottom wall 14, all of which contain suitable insulation between spaced parallel panels. The front wall contains a transversely elongated opening extending between the side walls at the level of the lower interior 16 of the housing for admitting a draft of air as indicated by the arrows in Fig. 2, the air rising within the broiler housing.

Overlying the upper interior of the housing is a heavy metallic grid 16 including laterally spaced cross members or bars 17 that extend length-wise from the rear to the front of the grid and are inclined downwardly from the horizontal in a frontward direction, as shown. Inclination of the cross members as described causes drainage of at least some of the grease from an edible 18 forwardly along the bars toward the transversely extending forward frame member 19 directly overlying the transversely extending receptacle 20 into which some of the grease drains. The receptacle is supported above the housing forward wall 11 by an offset shoulder 21 in heat reflector panel 22 inwardly spaced from the forward wall 11. Grease in the receptacle drains therealong toward the right side of the housing as viewed in Fig and then drains into a removable pan 23 supported on bottom 14 of the broiler and exposed through forward opening 15 in the front wall to be accessible for removal.

Coming now to a description of the heating means underlying the grid in the upper interior of the housing series of electrical heating rods 25 extend through front wall 11 from the control unit 26, the rods at nside of panel 22 being bent vertically upwardly and then horizontally to extend at a uniform level from front to rear across the upper interior of the housing. Each rod comprises two laterally spaced stretches 27 that are joined by a U-bend 28 directly forwardly of an upright rear reflector panel 29 within the housing interior as shown in Fig. 2. Electrical energization of the parallel rods is controlled by manipulation of the knobs 30 of the control unit shown in Figs. 1 and 2. A horizontal work shelf 100 conveniently overlies the control unit 23 at the level of the grid forward arm.

Supported on each pair of rod stretches 27 is a metallic hood 31 having channel shape with two side flanges 32 extending downwardly from the outer edges of an inverted V-shaped cover 33. The apex of the V-shaped hood cover is supported at its rearward end by a pin 34 projecting forwardly from the rear reflector panel 29, and the flanged sides 32 of the hood are spaced apart so as to closely receive there-between the rod stretches 27, which orient the hood to extend horizontally from front to rear within the broiler housing. As can be seen from Figs. 1 through 3, heat from the electrically energized resistance rods is directly transferrable to the hoods 31, and the extensive surface area of the latter presented to the grid bars 17 radiates heat upwardly to the bars and an edible supported thereon. At the same time, uncombusted droppings from the edible are adapted to fall off the hood surfaces due to the inclination thereof, and downwardly through the open formation between the hoods and the heating rods, together with the unintercepted droppings falling directly from the edible and the grid.

Underlying the opening between the hoods and heating rods is a screen 35 adapted to intercept the falling droppings and at the same time to receive heat radiated downwardly from the rods, passing only a small portion of such radiation downwardly therethrough. Since the screen is disposed above the bottom of the broiler, air entering through the front opening 15 passes upwardly through the screen cooling it and pre-heating the air so that the air will more rapidly combust grease droppings on the hoods. At the same time, the droppings falling on the screen 35 are cooled by the rising air and the screen is spaced sufficiently below the heater rods that the droppings are not ignited. Therefore, there is no flaming in the lower interior of the broiler, and this circumstance in combination with the breaking up of incident heat radiation on screen 35 serves to keep the lower interior at a relatively cool temperature.

A second screen 36 is exposed in underlying relation to screen 35 and extends horizontally therebeneath for further dissipating heat radiation. As a result, the control mechanism for manipulating forward tilting of the grid and including the arm 38 that extends beneath the lower screen just above the bottom wall 14 of the grid, is kept cool so that the user may grasp handle 37 attached to the arm and projecting forwardly through the front opening 15, working the handle transversely back and forth between the side walls of the broiler for lifting and lowering the grid without danger of burning his hand. Arm 38 is pivoted at 39 closer to the rear wall than to the handle so as to give mechanical advantage for lifting the grid. The rearward terminal end of the arm is attached to one arm of a bell crank 40 pivoted to the rear wall of the broiler at 41. The other bell crank arm is connected with a vertically elongated rod or support 42 that is movable up and down in response to handle transverse movement to lift and lower the grid.

As shown in Figs. 2 and 3 the upper terminal end of the rod 42 is upwardly received in a recess 43 sunk upwardly into the transverse rear frame member 44 of the grid thereby interlocking the grid and the rod during lifting and lowering of the grid to prevent forward sliding of the latter off the broiler housing. However, when the grid is in its lower-most position and seats on side brackets 45, the rod is downwardly retracted from the recess 43 to disengage the grid and the latter may then be removed from the broiler housing for cleaning by grasping the front handle 46 and sliding the grid forwardly along the side bracket upper surfaces shown at 47 in Fig. 5. The latter brackets have forwardly upturned edges at 48 for retaining the grid against forward sliding when the grid is in its lowermost position and not lifted, as viewed in Fig. 2.

As best shown in Figs. 3 and 4 the control arm 38 may be held in different transverse positions corresponding to different tilt positions of the grid by interlocking engagement with notch shoulders 49 formed in a plate 50 attached to the bottom wall 14 of the grid. The plate extends transversely in a vertical plane near the opening 15 in the front wall of the broiler so as to be viewable by the operator when he manipulates handle 37. Depression of the arm 38 into the notches for engagement with shoulders 49 is accommodated by the arm pivot 39 which may be rather loose.

In order that the full weight of the grid may not be transmitted to the hand of a user, a tension spring 52, as seen in Figs. 3 and 4 is connected between the control arm 38 and the side wall of the housing. The spring pulls the arm clockwise as viewed in Fig. 4 tending to lift the support rod 42 and the grid. Thus, the spring absorbs part of the grid weight but not all thereof, in order that the operator in manipulating handle 37 may feel resistance to handle movement, by which he will be best enabled to lift and lower the grid comfortably and with desirable control.

Figs. 2 and 3 show the screens 35 and 36 frictionally retained on and supported by side flanges 55 and 56 adapting them to be readily removed frontwardly through the opening 15 without obstruction by the grid lifting mechanism. When the screens are removed, access to all of that mechanism is readily gained through the front opening for adjusting or repairing same. As mentioned in the introduction, air flowing through opening 15 cools the handle 37 and arm 38 and also the screens 35 and 36 which absorb heat radiation downwardly from the electric heaters, minimizing radiation heating of the arm 38. Thus, the latter is kept cool at all times and remains remote from flames above the hoods 31 in the upper interior of the broiler.

I claim:

1. An improved adjustable grid broiler, comprising an upright housing having front, side, rear and bottom walls, a heavy grid overlying the upper interior of the housing, heater means underlying the grid within the housing interior for supplying heat to the grid, said housing front wall containing an opening through which outside air may pass into the housing interior and upwardly therein to said heater and grid, means for variably frontwardly tilting the grid including a movable arm extending above the level of said bottom wall and projecting forwardly through said front wall opening so as to be accessible at the front of the housing and support means movable up and down near the housing rear wall to lift and lower the grid from the rear thereof in response to arm movement in said opening, and means near the front of said housing for holding said arm in different positions corresponding to different forward tilt positions of said grid.

2. An improved adjustable grid broiler, comprising an upright housing having front, side, rear and bottom walls, a heavy grid overlying the upper interior of the housing, heater means underlying the grid within the housing interior for supplying heat to the grid, said housing front wall containing a transversely elongated opening below the level of said heater means and through which outside air may pass into the housing interior and upwardly therein to said heater and grid, means for variably frontwardly tilting the grid including an arm extending above the level of said bottom wall and projecting forwardly through said front wall opening so as to be accessible at the front of the housing and support means movable up and down near the housing rear wall to lift and lower the grid from the rear thereof in response to transverse arm movement in said opening, and means near the front of said housing for holding said arm in different transverse positions corresponding to different forward tilt portions of said grid.

3. An improved adjustable grid broiler, comprising an upright housing having front, side, rear and bottom walls, a heavy grid overlying the upper interior of the housing, heater means underlying the grid within the housing interior for supplying heat to the grid, said housing front wall containing a transversely elongated opening through which outside air may pass into the housing interior to said heater and grid, means for variably frontwardly tilting the grid including an arm extending above the level of said bottom wall and projecting forwardly through said front wall opening so as to be accessible at the front of the housing and support means movable up and down near the housing rear wall to lift and lower the grid from the rear thereof in response to transverse arm movement in said opening, said support means and grid being interlocked in all but the lowermost position of the grid, and means near the front of said housing for holding said arm in different transverse positions corresponding to different forward tilt positions of the grid.

4. An improved adjustable tilt broiler, comprising an upright housing having front, side and rear walls, a heavy grid overlying the upper interior of the housing, heater means within the housing interior for supplying heat to the grid, said housing front wall containing a transversely elongated opening through which outside air may pass into the housing interior to said heater and grid, means for variably frontwardly tilting the grid including an arm projecting forwardly through said front wall opening so as to be accessible at the front of the housing and support means movable up and down near the housing rear wall to lift and lower the grid from the rear thereof in response to transverse arm movement in said opening, yieldable means within the housing transmitting force acting through said support means to counter the weight of the grid, and means near the front interior of said housing for holding said arm in different transverse positions corresponding to different forward tilt positions of the grid.

5. An improved adjustable grid broiler, comprising an upright housing having front, side, rear and bottom walls, a heavy grid overlying the upper interior of the housing, heater means within the upper interior of the housing for supplying heat to the grid, said housing front wall containing a transversely elongated opening below the level of said heater means and through which outside air may pass into the housing interior to said heater and grid, means for variably frontwardly tilting the grid including an arm projecting forwardly through said front wall opening so as to be accessible at the front of the housing and support means movable up and down near the interior side of the housing rear wall to lift and lower the grid from the rear thereof in response to transverse arm movement in said opening, means supporting the arm for transverse movement in closely spaced relation to the interior side of the housing bottom wall, and means including a plurality of shoulders near the lower front interior of the housing for holding said arm in different transverse positions corresponding to different forward tilt positions of the grid.

6. The invention as defined in claim 5 including means having a heat reflecting surface underlying said heater means and overlying said arm for interrupting downward heat radiation to said arm.

7. The invention as defined in claim 6 comprising a screen.

8. The invention as defined in claim 5 in which said grid tilting means includes a linkage interconnecting said arm and support means for converting transverse arm movement to up and down movement of said support means.

9. The invention as defined in claim 8 in which said linkage comprises a bell crank, and including a pivot carried by said rear wall and mounting said bell crank to pivot adjacent the interior side of said rear wall.

10. The invention as defined in claim 8 including a spring connected with said grid tilting means and transmitting force acting through said support means to counter the weight of the grid, said force being insufficient by itself to lift the grid.

11. The invention as defined in claim 10 comprising a tension spring connected between said arm and the housing.

12. The invention as defined in claim 8 in which said support means comprises a rod interlocked with said grid, said rod being downwardly movable by said arm to a lowermost position in which the rod is released from interlocking relation with the grid, whereby the grid may then be bodily removed from the housing.

13. The invention as defined in claim 5 including means overlying the heating means and presenting an extended grease receiving surface to the grid for radiating heat thereto and for intercepting droppings from an edible thereon, whereby said droppings may be ignited remotely from said grid tilting means.

14. The invention as defined in claim 13 comprising a plurality of heaters and a plurality of metallic hoods overlying same.

References Cited in the file of this patent

UNITED STATES PATENTS

| | | |
|---|---|---|
| 870,117 | Miller | Nov. 5, 1907 |
| 2,309,784 | Peron | Feb. 2, 1943 |
| 2,664,878 | Durant | Jan. 5, 1954 |
| 2,720,827 | Del Francia | Oct. 18, 1955 |

FOREIGN PATENTS

| | | |
|---|---|---|
| 6,605 | Great Britain | Apr. 17, 1889 |